(12) United States Patent
Izawa et al.

(10) Patent No.: US 12,199,417 B2
(45) Date of Patent: Jan. 14, 2025

(54) WIRE HARNESS

(71) Applicant: SUMITOMO WIRING SYSTEMS, LTD., Yokkaichi (JP)

(72) Inventors: Katsutoshi Izawa, Yokkaichi (JP); Kosuke Tanaka, Yokkaichi (JP); Ryuta Saito, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 145 days.

(21) Appl. No.: 18/027,505

(22) PCT Filed: Aug. 3, 2021

(86) PCT No.: PCT/JP2021/028716
§ 371 (c)(1),
(2) Date: Mar. 21, 2023

(87) PCT Pub. No.: WO2022/074923
PCT Pub. Date: Apr. 14, 2022

(65) Prior Publication Data
US 2023/0387671 A1   Nov. 30, 2023

(30) Foreign Application Priority Data

Oct. 7, 2020 (JP) .................. 2020-169936

(51) Int. Cl.
*H02G 3/04* (2006.01)
*B60R 16/02* (2006.01)
*H01B 7/00* (2006.01)

(52) U.S. Cl.
CPC ....... *H02G 3/0456* (2013.01); *B60R 16/0215* (2013.01); *H01B 7/0045* (2013.01); *H02G 3/0418* (2013.01)

(58) Field of Classification Search
CPC .. H02G 3/04; H02G 3/30; H02G 3/32; H02G 3/40; H02G 3/0418; H02G 3/0462;
(Continued)

(56) References Cited

U.S. PATENT DOCUMENTS

| 7,740,211 B2* | 6/2010 | Dukes ................. H02G 1/08 248/74.1 |
| 2019/0089142 A1 | 3/2019 | Sugino |

(Continued)

FOREIGN PATENT DOCUMENTS

| JP | H11-082813 A | 3/1999 |
| JP | H1182813 * | 3/1999 ............ F16L 3/1075 |

(Continued)

OTHER PUBLICATIONS

Oct. 19, 2021 International Search Report issued in International Patent Application No. PCT/JP2021/028716.

*Primary Examiner* — Paresh Paghadal
(74) *Attorney, Agent, or Firm* — Oliff PLC

(57) ABSTRACT

A wire harness to be attached to a vehicle body, the wire harness including: a wire harness main body having an electrical wire and an exterior tube covering the electrical wire; a first path restrictor attached to an outer periphery of the exterior tube and restricting a path of a straight part which is a portion of a path of the wire harness main body that is straight; a second path restrictor attached to the outer periphery of the exterior tube and restricting a path of a bent part which is a portion of the path of the wire harness main body that bends; and an engagement engaging the second path restrictor in a circumferential direction of the wire harness main body.

10 Claims, 9 Drawing Sheets

(58) Field of Classification Search
CPC .............. H02G 3/0481; B60R 16/0207; B60R 16/0215; H01B 7/0045
USPC ............................... 248/68.1, 73, 74.1–74.4
See application file for complete search history.

(56) References Cited

U.S. PATENT DOCUMENTS

| | | |
|---|---|---|
| 2020/0203938 A1 | 6/2020 | Yanazawa et al. |
| 2020/0274343 A1 | 8/2020 | Sugino |

FOREIGN PATENT DOCUMENTS

| | | |
|---|---|---|
| JP | 2019-053894 A | 4/2019 |
| JP | 2020-102974 A | 7/2020 |

\* cited by examiner

WIRE HARNESS

BACKGROUND

The present disclosure relates to a wire harness.

JP 2019-53894A, for example, discloses a wire harness for a vehicle. This wire harness includes a wire harness main body having electrical wires and an exterior member that covers the electrical wires, and a path restricting member that is attached to an outer periphery of the exterior member and restricts the path of the wire harness main body. The path restricting member is constituted to include both a straight restricting part that restricts portions of the path of the wire harness main body that are straight and a bend restricting part that restricts portions of the path of the wire harness main body that bend.

SUMMARY

With a wire harness such as described above, it is desirable to configure the position of the straight restricting part of the path restricting member to be adjustable with respect to the bend restricting part.

An exemplary aspect of the disclosure provides a wire harness in which the position of a straight restricting part is adjustable with respect to a bend restricting part.

A wire harness of the present disclosure is a wire harness to be attached to a vehicle body, including a wire harness main body having an electrical wire and an exterior tube covering the electrical wire; a first path restrictor attached to an outer periphery of the exterior tube and restricting a path of a straight part which is a portion of a path of the wire harness main body that is straight; a second path restrictor attached to the outer periphery of the exterior tube and restricting a path of a bent part which is a portion of the path of the wire harness main body that bends; and an engagement engaging the second path restrictor in a circumferential direction of the wire harness main body, wherein: the first path restrictor has an insertion opening which is an opening along a lengthwise direction of the first path restrictor and extending over an entire length of the first path restrictor, the engagement is disposed within the insertion opening, the second path restrictor has a first engaging part which is a raised part or a recessed part, and the engagement has a second engaging part engagingly fitting together with the first engaging part, and engaging the first engaging part in the circumferential direction of the wire harness main body.

According to the present disclosure, it is possible to provide a wire harness in which the position of a straight restricting part is adjustable with respect to a bend restricting part.

DETAILED DESCRIPTION OF EMBODIMENTS

Description of Embodiments of Disclosure

Figure 1:
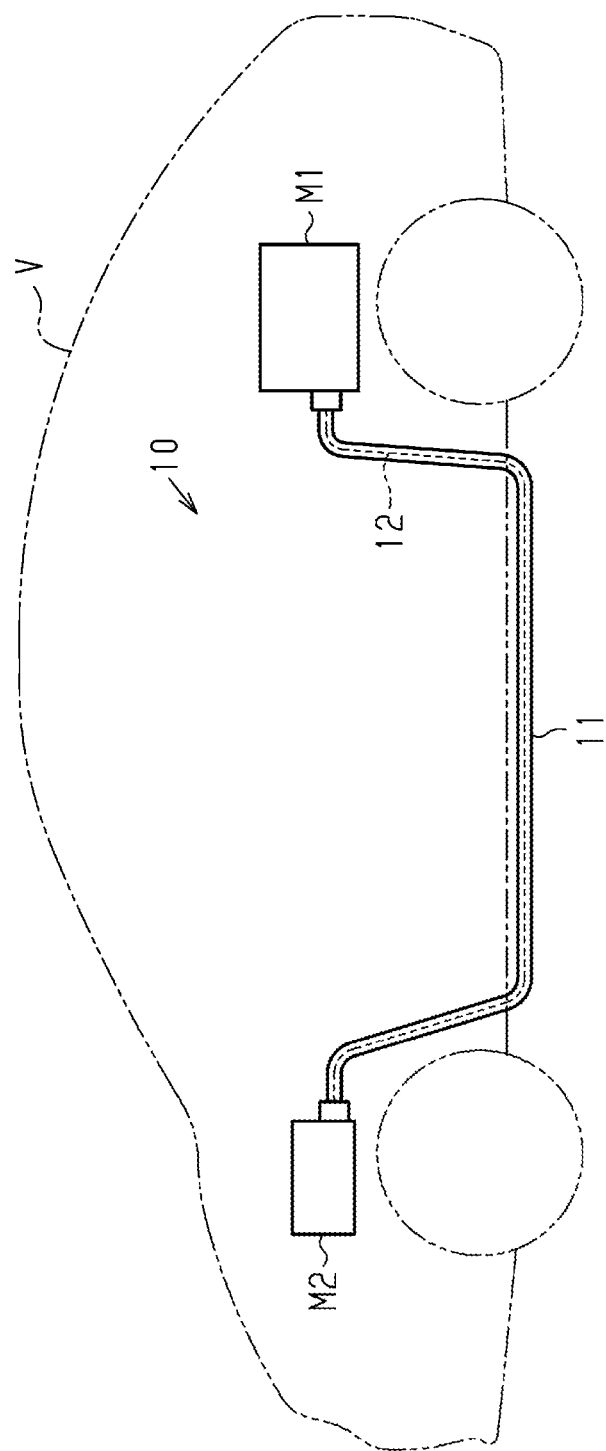
FIG. 1 is a schematic configuration diagram showing a wire harness of an embodiment.

Initially, modes of the present disclosure will be enumerated and described.

A wire harness of the present disclosure is:

[1] A wire harness to be attached to a vehicle body, including a wire harness main body having an electrical wire and an exterior member covering the electrical wire, a first path restricting member attached to an outer periphery of the exterior member and restricting a path of a straight part which is a portion of a path of the wire harness main body that is straight, a second path restricting member attached to the outer periphery of the exterior member and restricting a path of a bent part which is a portion of the path of the wire harness main body that bends, and an engaging member engaging the second path restricting member in a circumferential direction of the wire harness main body. The first path restricting member has an insertion opening which is an opening along a lengthwise direction of the first path restricting member and extending over an entire length of the first path restricting member, the engaging member is disposed within the insertion opening, the second path restricting member has a first engaging part which is a raised part or a recessed part, and the engaging member has a second engaging part engagingly fitting together with the first engaging part and engaging the first engaging part in the circumferential direction of the wire harness main body.

According to this configuration, the wire harness includes the first path restricting member that restricts a straight part of the path of the wire harness main body and the second path restricting member that restricts a bent part of the path of the wire harness main body. The position of the first path restricting member with respect to the second path restricting member is thus adjustable in the lengthwise direction of the wire harness main body.

Also, according to this configuration, the insertion opening of the first path restricting member is an opening extending in the lengthwise direction of the first path restricting member, and extends over the entire length of the first path restricting member. It is thereby possible to attach the first path restricting member to the exterior member through the insertion opening, after performing terminal processing such as attaching a connector to a lengthwise end portion of the electrical wire. In this way, the first path restricting member is subsequently attachable, thus enabling the assembly workability of the wire harness to be improved.

Also, the engaging member that engages the second path restricting member in the circumferential direction of the wire harness main body is disposed within the insertion opening of the first path restricting member. According to this configuration, the engaging member can be constituted to be contactable with the insertion opening of the first path restricting member in the circumferential direction of the first path restricting member. The engaging member thereby restricts rotation of the first path restricting member in the circumferential direction thereof, thus enabling the first path restricting member to be kept from rotating in the circumferential direction thereof.

[2] In the circumferential direction of the wire harness main body, a dimension of the engaging member is smaller than a dimension of the insertion opening.

According to this configuration, the engaging member is movable along the circumferential direction of the wire harness main body, within the insertion opening of the first path restricting member. Accordingly, it is possible to adjust the relative position of the first path restricting member with respect to the engaging member in the circumferential direction of the wire harness main body.

[3] One of the first engaging part and the second engaging part is a recessed part, the other of the first engaging part and the second engaging part is a raised part, and, in the circumferential direction of the wire harness main body, a dimension of the recessed part is larger than a dimension of the raised part.

According to this configuration, the raised part is movable along the circumferential direction of the wire harness main body within the recessed part. Accordingly, it is possible to adjust the relative positions of the engaging member and the first path restricting member with respect to the second path restricting member in the circumferential direction of the wire harness main body.

[4] The second path restricting member has a plurality of the first engaging part, and the plurality of first engaging parts are disposed to be displaced in the circumferential direction of the wire harness main body.

According to this configuration, which of the plurality of first engaging parts of the second path restricting member is to be fitted together with the second engaging part of the engaging member is selectable according to the path of the bent part of the wire harness main body. The degree of freedom in the layout of the wire harness can thus be improved.

[5] The second path restricting member has an enclosing part surrounding an outer periphery of the first path restricting member, the enclosing part has part of the main body part of the second path restricting member, and a lid part that is connected to the main body part, and the first engaging part is provided in the lid part.

According to this configuration, the second path restricting member that includes the enclosing part is subsequently attachable to the first path restricting member, due to the enclosing part being divided into the main body part and the lid part. The assembly workability of the wire harness can thereby be even further improved.

[6] With the insertion opening of the first path restricting member as a first insertion opening, the main body part has a second insertion opening which is an opening along a lengthwise direction of the second path restricting member and extending over an entire length of the second path restricting member, and the lid part partially covers the second insertion opening in the lengthwise direction of the second path restricting member.

According to this configuration, the second insertion opening is an opening extending in the lengthwise direction of the second path restricting member, and extends over the entire length of the second path restricting member. It is thereby possible to attach the second path restricting member to the exterior member through the insertion opening, after performing terminal processing such as attaching a connector to a lengthwise end portion of the electrical wire. In this way, the second path restricting member is subsequently attachable, thus enabling the assembly workability of the wire harness to be further improved.

[7] The vehicle body has an assembly surface to which the wire harness main body is to be assembled, and the lid part is disposed so as to be closer to the assembly surface than is the main body part.

According to this configuration, in the second path restricting member, the first engaging part that engages the engaging member disposed within the insertion opening of the first path restricting member is provided on the lid part which is closer to the assembly surface of the vehicle body. Also, in the first path restricting member, the position of the insertion opening in the circumferential direction is determined by the second path restricting member and the engaging member. That is, according to this configuration, the insertion opening of the first path restricting member can be constituted so as to face toward the lid part of the second path restricting member, that is, toward the assembly surface of the vehicle body. Accordingly, the insertion opening of the first path restricting member can be kept from facing the opposite side to the assembly surface of the vehicle body.

[8] The first path restricting member is provided for each of a pair of the straight part provided one on either side of the bent part on the path of the wire harness main body, and the engaging member is provided in the insertion opening of each of the pair of first path restricting members. According to this configuration, it is possible to adjust the position of the first path restricting members disposed on either side of the second path restricting member in the lengthwise direction of the wire harness main body.

[9] The first path restricting member has a first end portion and a second end portion which are both end portions in a circumferential direction of the first path restricting member and form the insertion opening, and a protruding part protruding from an inner surface of at least one of the first end portion and the second end portion and contacting an outer surface of the exterior member.

According to this configuration, the first path restricting member has the protruding part that protrudes from the inner surface of at least one of the first end portion and the second end portion and contacts the outer surface of the exterior member. Thus, the first path restricting member can be suitably kept from detaching from the exterior member through the insertion opening.

[10] The protruding part protrudes from an inner surface of a distal end of at least one of the first end portion and the second end portion.

According to this configuration, the path restricting member can be even more reliably kept from detaching from the exterior member through the insertion opening, compared to the case where, for example, the protruding part protrudes from the inner surface at a position slightly away from the distal end of the first end portion or the distal end of the second end portion.

Detailed Description of Embodiments of Disclosure

Specific examples of a wire harness of the present disclosure will be described below with reference to the drawings. In the individual diagrams, some of the configurations may be shown in an exaggerated manner or a simplified manner, for convenience of description. Also, the dimensional ratios of various portions may differ in the individual diagrams. Also, "orthogonal" herein is not only strictly orthogonal but also includes generally orthogonal within a range that achieves the operation and effect of the present embodiment. Note that the present disclosure is not limited to these illustrative examples and is defined by the claims, and all changes that come within the meaning and range of equivalency of the claims are intended to be embraced therein.

Note that "tubular" as used in the description herein includes not only that in which the peripheral wall is formed continuously around the entire periphery in the circumferential direction, but also that in which a plurality of components are combined to form a tubular shape, or that which is partially cut away in the circumferential direction such as a C-shape. Also, a "tubular" shape includes a circular shape, an elliptical shape, and a polygonal shape with pointed or rounded corners. Also, the term "annular" as used in the description herein may refer to any structure that forms a loop, a continuous shape without end portions, and a generally loop-shaped structure having a gap such as a C-shape. Note that an "annular" shape includes, but is not limited to, a circular shape, an elliptical shape, and a polygonal shape with pointed or rounded corners.

Overall Configuration of Wire Harness 10

A wire harness 10 shown in FIG. 1 connects devices provided in a vehicle V, for example. The wire harness 10 is disposed in the vehicle V such that a lengthwise intermediate portion of the wire harness 10 passes outside the vehicle cabin such as under the floor of the vehicle V, for example.

The wire harness 10 includes a wire harness main body 11. The wire harness main body 11 electrically connects a first device M1 and a second device M2 that are provided in the vehicle V. As examples of the first device M1 and the second device M2, the first device M1 is a high-voltage battery disposed in a location toward the rear of the vehicle V, and the second device M2 is an inverter disposed in a location toward the front of the vehicle V. The first device M1 which is a high-voltage battery is, for example, a battery capable of supplying a voltage of 100 volts or more. The second device M2 which is an inverter is connected to a motor (not shown) for driving wheels and serves as a power source for vehicle travel. The inverter generates AC power from the DC power of the high-voltage battery and supplies that AC power to the motor. The wire harness main body 11 is wired along a path that bends two-dimensionally or three-dimensionally.

Configuration of Wire Harness Body 11

Figure 5:
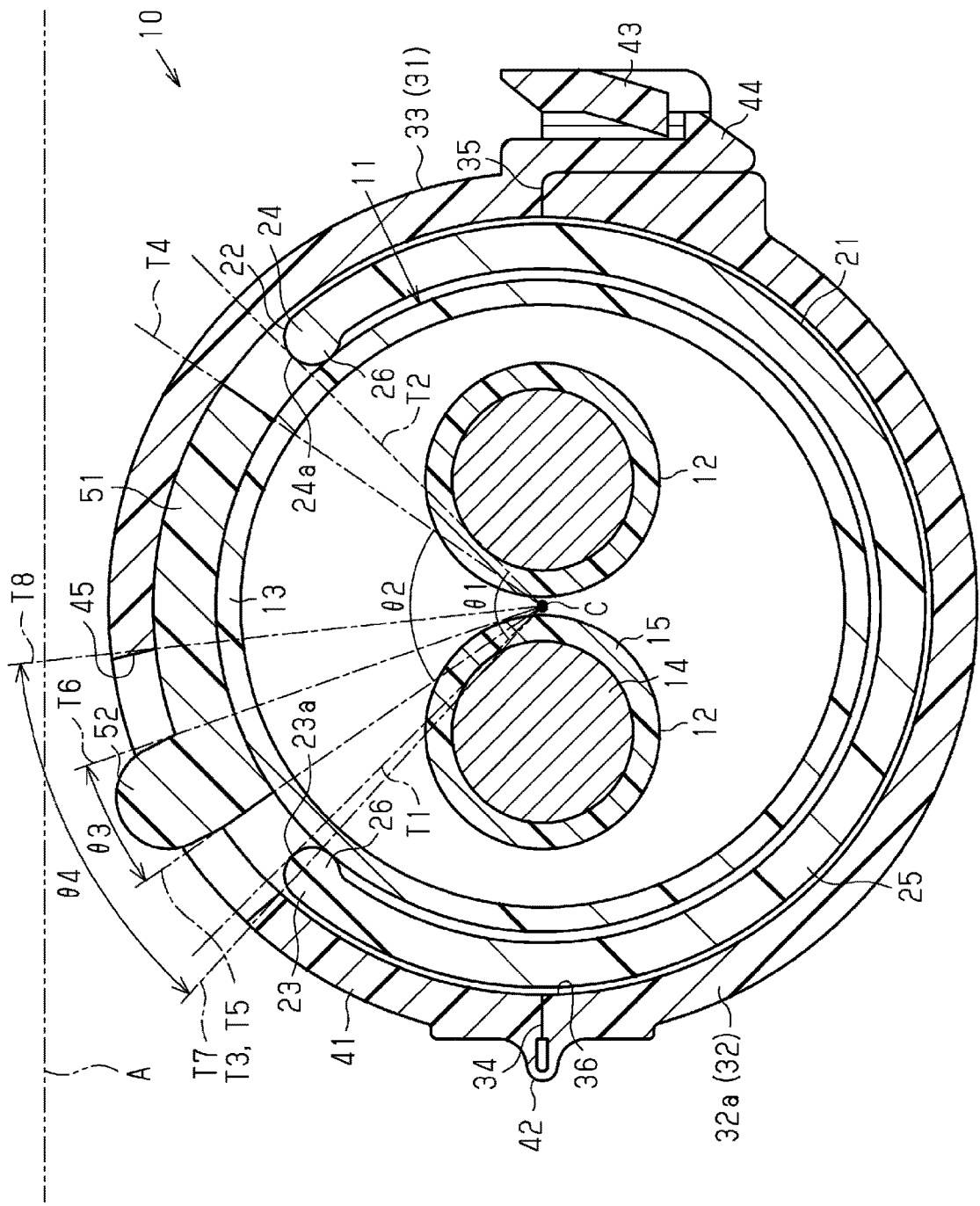
FIG. 5 is a cross-sectional view taken along line 5-5 in FIG. 4.
Figure 6:
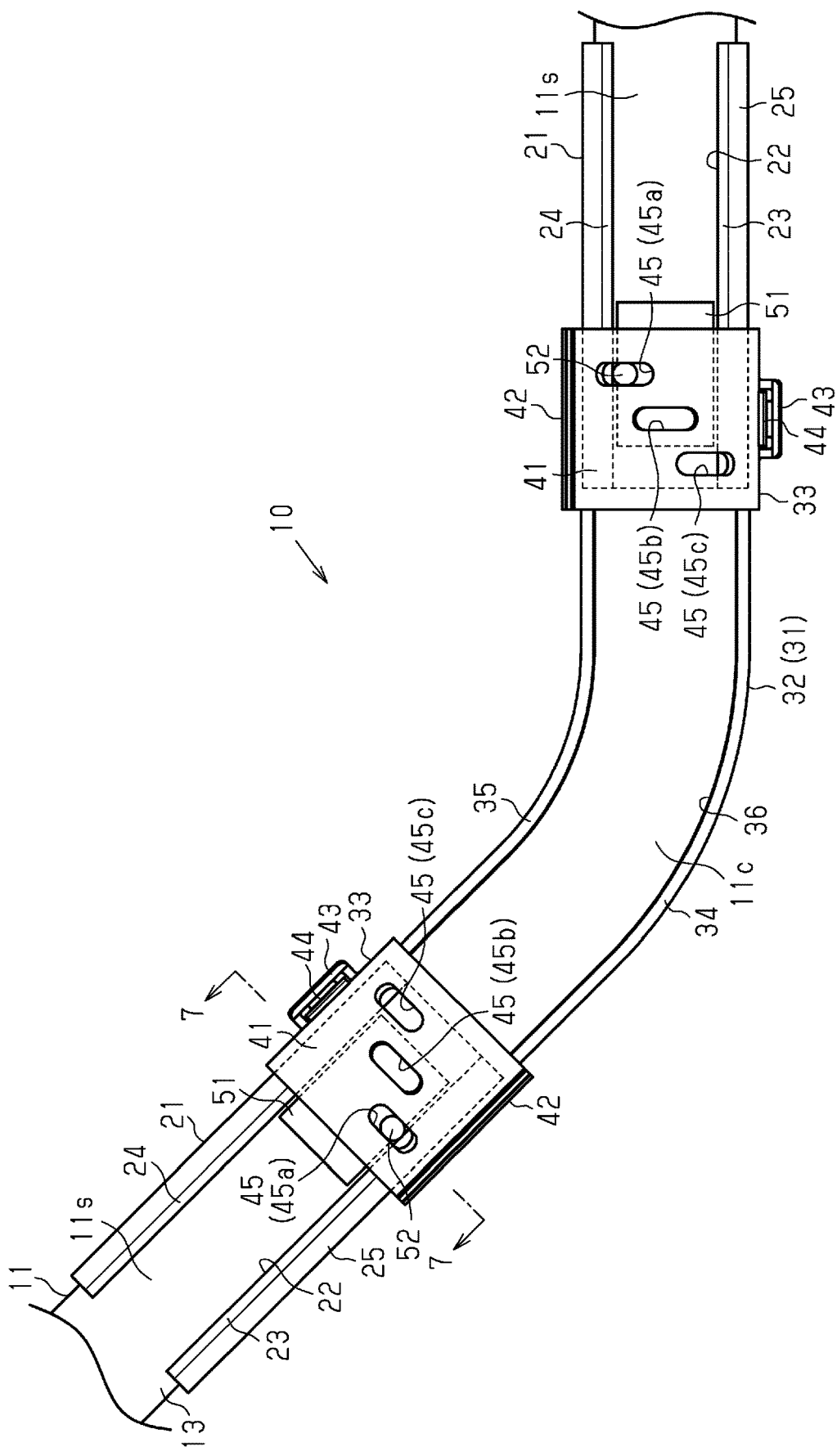
FIG. 6 is a plan view showing part of the wire harness of an example change.

As shown in FIGS. 5 and 6, the wire harness main body 11 has an electrical wire 12 and an exterior member 13 (exterior tube).

A plurality of electrical wires 12 are provided, for example. The wires 12 are coated wires, for example. That is, the wires 12 each have a core wire 14 and an insulating coating 15 that covers the outer periphery of the core wire 14. The core wire 14 is constituted by a flexible conductor capable of being easily bent, for example. Note that a twisted wire obtained by twisting a plurality of metal strands together is given as an example of the flexible conductor. As the material of the core wire 14, a metal material such as a copper-based or aluminum-based metal material, for example, can be used.

The insulating coating 15 covers the outer peripheral surface of the core wire 14 around the entire circumference, for example. The insulating coating 15 is constituted by an insulating material such as a synthetic resin, for example. The insulating coating 15 can be formed by performing extrusion molding on the core wire 14, for example.

The exterior member 13 has a long tubular shape as a whole. The plurality of wires 12 are inserted into the inner space of the exterior member 13. That is, the exterior member 13 collectively encloses the outer periphery of the plurality of wires 12. The exterior member 13 protects the wires 12 from projectiles and water droplets, for example. The wires 12 are connected at one end to the first device M1, and the other ends of the wires 12 are connected to the second device M2. The wires 12 are high-voltage electrical wires capable of handling high voltages and large currents.

The exterior member 13 is flexible and easily bendable. A corrugated tube made of synthetic resin, for example, is given as an example of the flexible exterior member 13. The corrugated tube has a bellows shape constituted by alternating large and small diameter portions in the lengthwise direction thereof. That is, the corrugated tube has a recessed part and a raised part that are alternately continuous in the lengthwise direction thereof. Note that a synthetic resin such as polyolefin, polyamide, polyester or ABS resin, for example, can be used as the constituent material of the exterior member 13.

Figure 2:
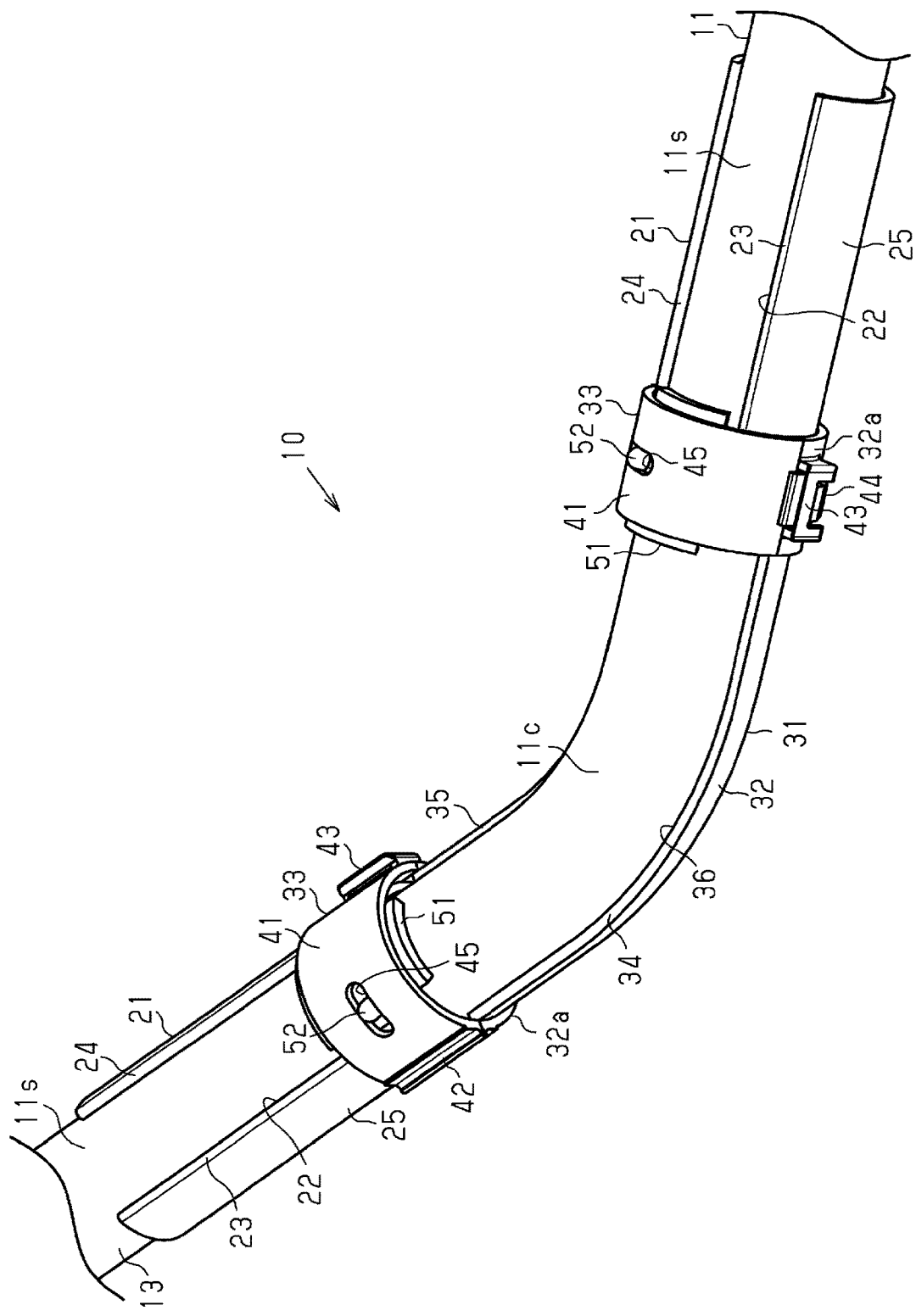
FIG. 2 is a perspective view showing part of the wire harness of the embodiment.

As shown in FIG. 2, the wire harness 10 includes a pair of first path restricting members 21 (first path restrictors), a second path restricting member 31 (second path restrictors), and a pair of engaging members 51 (engagements). Note that, in FIG. 1, illustration of the first path restricting members 21, the second path restricting member 31, and the engaging members 51 is omitted.

The first path restricting members 21 and the second path restricting member 31 are attached to the outer periphery of the exterior member 13. Specifically, the first path restricting members 21 are attached to the outer periphery of the exterior member 13 in a straight part 11s, which is a portion of the path of the wire harness main body 11 that is straight. The first path restricting members 21 restrict the path of the wire harness main body 11 in the straight part 11s.

The second path restricting member 31 is attached to the outer periphery of the exterior member 13 in a bent part 11c, which is a portion of the path of the wire harness main body 11 that bends. The second path restricting member 31 restricts the path of the wire harness main body 11 in the bent part 11c. The first path restricting members 21 are respectively provided for a pair of straight parts 11s provided one on either side of the bent part 11c in the path of the wire harness main body 11, for example. The first path restricting members 21 and the second path restricting member 31 support the exterior member 13 such that the wire harness main body 11 does not deviate from a predetermined path due to bending under its own weight or the like.

Configuration of First Path Restricting Member 21

As shown in FIG. 5, the first path restricting member 21 covers part of the outer peripheral surface of the exterior member 13 in the circumferential direction. For example, the first path restricting member 21 covers a range spanning more than half of the outer periphery of the exterior member 13. Also, the first path restricting member 21 extends along the lengthwise direction of the exterior member 13.

The first path restricting member 21 has a first insertion opening 22 which is an opening that extends in the lengthwise direction of the first path restricting member 21. Also, the first path restricting member 21 has a first end portion 23 and a second end portion 24 which are both end portions in the circumferential direction of the first path restricting member 21 and form the first insertion opening 22. Also, the first path restricting member 21 has an intermediate portion 25 which is a region that joins the first end portion 23 and the second end portion 24. In other words, the first path restricting member 21 includes the intermediate portion 25 formed so as to cover part of the exterior member 13 in the circumferential direction, the first end portion 23 and the second end portion 24 provided at either end of the intermediate portion 25, and the first insertion opening 22 that is formed by the first end portion 23 and the second end portion 24.

The first end portion 23 and the second end portion 24 oppose each other at a distance in the circumferential direction of the first path restricting member 21. The space between the first end portion 23 and the second end portion 24 is constituted as the first insertion opening 22.

The first insertion opening 22 is an opening along the lengthwise direction of the first path restricting member 21, and extends over the entire length of the first path restricting member 21. The opening width of the first insertion opening 22, that is, the shortest distance between the first end portion 23 and the second end portion 24, is smaller than the outer diameter of the exterior member 13. In the first insertion opening 22, the exterior member 13 is inserted along a direction orthogonal to the lengthwise direction of the first path restricting member 21.

The intermediate portion 25 constitutes a main portion of the first path restricting member 21. The cross-sectional shape of the intermediate portion 25 is a circular arc shape, for example. Note that the radial thickness of the intermediate portion 25 is uniform in the circumferential direction, for example. Note that the cross-sectional shape of the first path restricting member 21 is uniform over the entire length of the first path restricting member 21, for example. Also, a center axis C in the cross section of the intermediate portion 25 is a straight line, for example. That is, the first path restricting member 21 has a shape extending linearly in one direction.

In the cross section of the first path restricting member 21, a tangent of the first end portion 23 that passes through the center axis C of the intermediate portion 25 is given as a tangent T1, and a tangent of the second end portion 24 that passes through the center axis C is given as a tangent T2. A dimension θ1 of the first insertion opening 22 in the circumferential direction of the wire harness main body 11 is the opening angle of the first insertion opening 22 centered on the center axis C, that is, the angle that is formed by the tangent T1 and the tangent T2. The dimension θ1 of the first insertion opening 22 is in a range of 60 degrees to 120 degrees, for example.

The first path restricting member 21 has a protruding part 26 (protrusion) that protrudes from the inner surface of both the first end portion 23 and the second end portion 24. The cross-sectional shape of each protruding part 26 is a semicircular shape, for example. The protruding parts 26 extend along the lengthwise direction of the first path restricting member 21, for example. Also, the protruding parts 26 extend over the entire length of the first path restricting member 21 in the lengthwise direction thereof, for example.

The protruding parts 26 protrude toward the exterior member 13. The protruding parts 26 contact the outer surface of the exterior member 13. Also, the protruding parts 26 press the exterior member 13, for example. The exterior member 13 is elastically sandwiched by the protruding parts 26 and the intermediate portion 25. The connection of the first path restricting member 21 to the exterior member 13 will thereby be strong. Accordingly, the first path restricting member 21 attached to the outer periphery of the exterior member 13 is kept from moving in the lengthwise direction of the exterior member 13.

Note that, in the state where the exterior member 13 is inserted inside the first path restricting member 21, the opening width of the first insertion opening 22 does not necessarily return to its original width, that is, the width when the exterior member 13 is not inserted inside the first path restricting member 21. Specifically, the opening width of the first insertion opening 22 may be slightly larger than its original width, due to the elastic deformation that causes the first path restricting member 21 to return to its original shape being impeded by the exterior member 13. Also, in the state where the exterior member 13 is inserted inside the first path restricting member 21, the opening width of the first insertion opening 22 may return to its original width, due to the exterior member 13 being flexed by the pressing force of the first path restricting member 21. That is, the size of the opening width when the exterior member 13 has been inserted inside the first path restricting member 21 will be based on the rigidity, flexibility and the like of the exterior member 13 and the first path restricting member 21.

In the first path restricting member 21, a circumferential distal end 23a of the first end portion 23 and a circumferential distal end 24a of the second end portion 24 are curved, as seen from the lengthwise direction of the first path restricting member 21. In other words, the cross-sectional shape of the distal end 23a of the first end portion 23 and the distal end 24a of the second end portion 24 is a curved shape. Note that the first insertion opening 22 is formed by the distal end 23a of the first end portion 23 and the distal end 24a of the second end portion 24. Also, the protruding part 26 protrudes from the inner surface of the distal end 23a of the first end portion 23 and the inner surface of the distal end 24a of the second end portion 24.

Note that, as the material of the first path restricting member 21, a synthetic resin such as polypropylene, polyamide or polyacetal, for example, can be used. The first path restricting member 21 can be molded by a known method such as extrusion molding or injection molding, for example.

Configuration of Second Path Restricting Member 31

Figure 3:
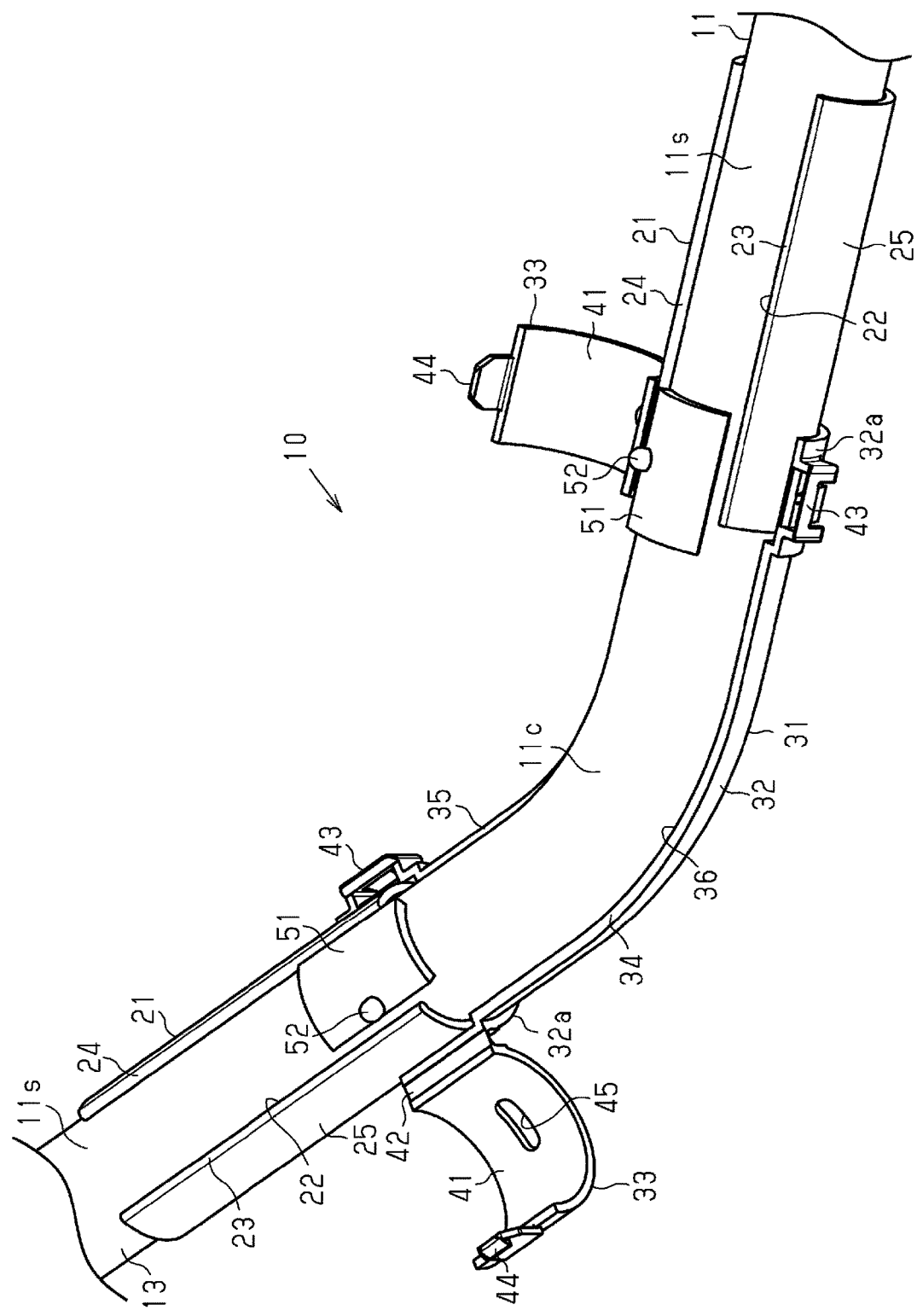
FIG. 3 is an exploded perspective view for showing a first path restricting member, a second path restricting member, and an engaging member of the embodiment.

As shown in FIGS. 2 and 3, the second path restricting member 31 is attached to the exterior member 13 in the bent part 11c of the wire harness main body 11. The second path restricting member 31 bends along the shape of the bent part 11c. Note that, as the material of the second path restricting member 31, a synthetic resin, for example, can be used. The second path restricting member 31 can be molded by a known method such as injection molding, for example.

The second path restricting member 31 includes a main body part 32 (main body) and a pair of enclosing parts 33.

The main body part 32 extends along the path of the bent part 11c of the wire harness main body 11. The main body part 32 covers part of the outer peripheral surface of the exterior member 13 in the circumferential direction. The main body part 32 has a substantially semi-cylindrical shape, for example. That is, the main body part 32 covers a range spanning roughly 180 degrees of the outer periphery of the exterior member 13.

Figure 4:
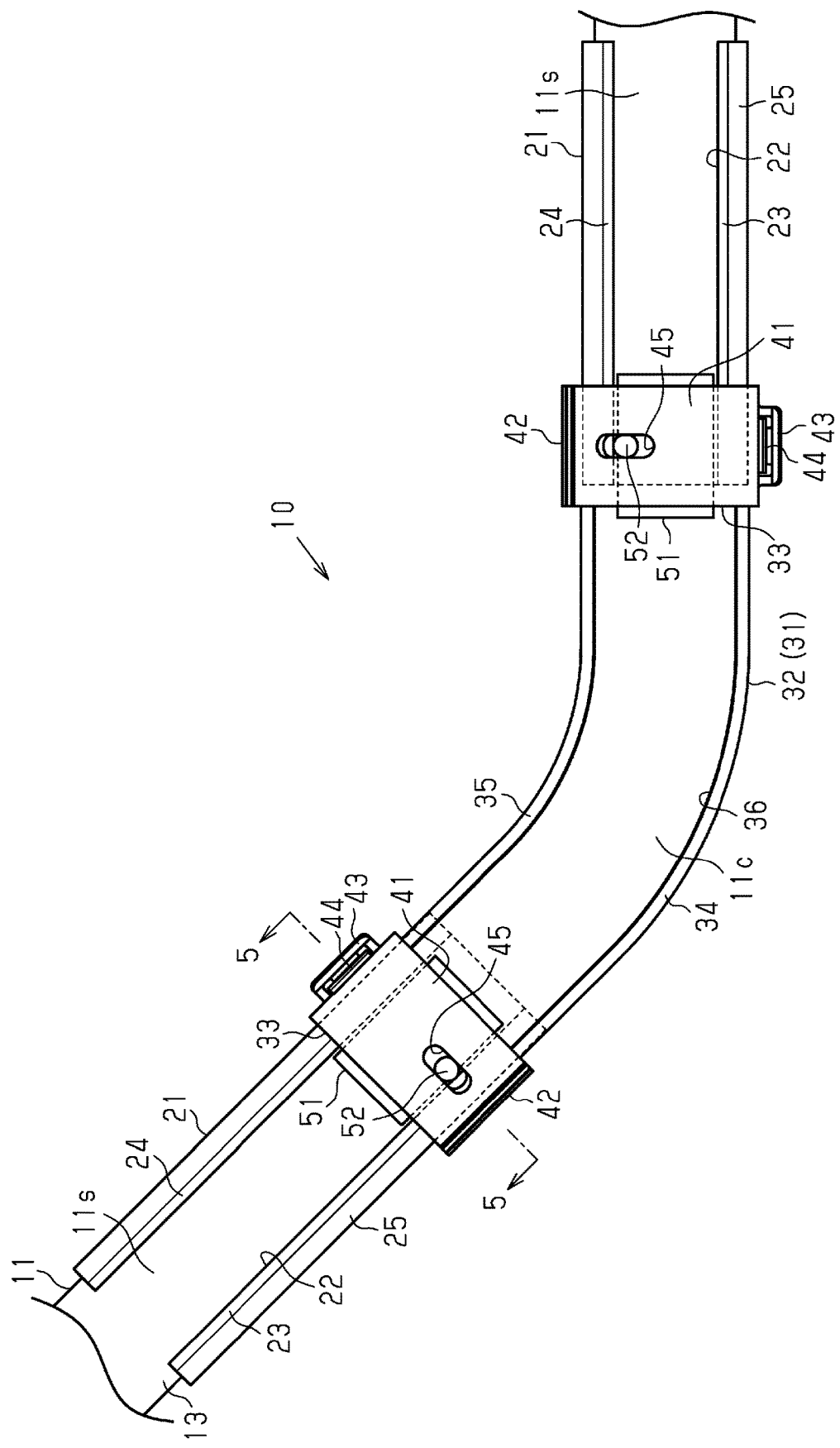
FIG. 4 is a plan view showing part of the wire harness of the embodiment.

The main body part 32 has a third end portion 34 and a fourth end portion 35 which are both end portions in the circumferential direction of the main body part 32. Also, the main body part 32 has a second insertion opening 36 that is formed by the third end portion 34 and the fourth end portion 35. The second insertion opening 36 is the opening between the third end portion 34 and the fourth end portion 35. The second insertion opening 36 is an opening that extends in the lengthwise direction of the second path restricting member 31. Also, the second insertion opening 36 extends over the entire length of the second path restricting member 31. As shown in FIG. 4, the third end portion 34 and the fourth end portion 35 bend along the bent part 11c of the wire harness main body 11, as seen from the opening direction of the second insertion opening 36. The opening width of the second insertion opening 36, that is, the shortest distance between the third end portion 34 and the fourth end portion 35, is equivalent to the outer diameter of the exterior member 13 or slightly larger than the outer diameter of the exterior member 13. In the second insertion opening 36, the exterior member 13 is inserted along a direction orthogonal to the lengthwise direction of the second path restricting member 31.

As shown in FIGS. 2 and 3, the enclosing part 33 is provided at both end portions of the second path restricting member 31 in the lengthwise direction of the wire harness main body 11.

The enclosing part 33 has an end portion 32a of the main body part 32 in the lengthwise direction of the wire harness main body 11 and a lid part 41 (lid). The lid part 41 is integrally formed with the end portion 32a of the main body part 32, for example. The lid part 41 has an approximately semi-cylindrical shape, for example. The lid part 41 covers the second insertion opening 36 at the end portion 32a of the main body part 32. The enclosing parts 33 enclose the outer periphery of the lengthwise end portion of the first path restricting members 21 with the lid part 41 and the end portion 32a of the main body part 32.

The enclosing part 33 has a hinge part 42 that joins the end portion 32a of the main body part 32 and the lid part 41, for example. The hinge part 42 joins one circumferential end of the end portion 32a to one circumferential end of the lid part 41. A lock part 43 is provided at the other circumferential end of the end portion 32a. A claw part 44 is provided at the other circumferential end of the lid part 41.

The lid part 41 is rotatable between the open position shown in FIG. 3 and the closed position shown in FIG. 2 with the hinge part 42 as the axis. The lid part 41, in the closed position, covers the upper opening of the end portion 32a of the main body part 32. Also, when the lid part 41 is in the closed position, the claw part 44 catches on the lock part 43. The lid part 41 is thereby held in the closed position. In this way, the end portion 32a of the main body part 32 and the lid part 41 are connected to each other. When the end portion 32a and the lid part 41 are connected, the enclosing part 33 has an annular shape collectively surrounding the outer periphery of the wire harness main body 11 and the lengthwise end portion of the first path restricting members 21. The lid part 41, in the closed state, covers the first insertion opening 22 of the first path restricting members 21.

As shown in FIGS. 4 and 5, the lid part 41 of the second path restricting member 31 has a through hole 45 serving as a first engaging part. The through hole 45 passes through the lid part 41 along the radial direction of the exterior member 13, for example. Note that, in the present embodiment, the lid part 41 has one through hole 45. The through hole 45 is a long hole that extends along the circumferential direction of the first path restricting members 21, for example.

Configuration of Engaging Member 51

As shown in FIG. 5, the engaging member 51 is disposed within the first insertion opening 22. That is, the engaging member 51 is contactable, in the circumferential direction of the first path restricting members 21, with the first end portion 23 and the second end portion 24 constituting the first insertion opening 22. Also, in the closed state of the lid part 41, the engaging member 51 is located between the outer peripheral surface of the exterior member 13 and the lid part 41. The engaging member 51 contacts the outer peripheral surface of the exterior member 13, for example. Note that the engaging member 51 is constituted by a synthetic resin, for example.

In a cross section of the engaging member 51 orthogonal to the center axis C of the intermediate portion 25, a tangent of one circumferential end of the engaging member 51 that passes through the center axis C is given as T3, and a tangent of the other circumferential end of the engaging member 51 that passes through the center axis C is given as T4. A dimension θ2 of the engaging member 51 in the circumferential direction of the wire harness main body 11 is the occupation angle of the engaging member 51 centered on the center axis C, that is, the angle that is formed by the tangent T3 and the tangent T4. In the circumferential direction of the wire harness main body 11, the dimension θ2 of the engaging member 51 is set smaller than the dimension θ1 of the first insertion opening 22. The engaging member 51 is thereby movable along the circumferential direction of the wire harness main body 11, within the first insertion opening 22.

The engaging member 51 has a raised part 52 that protrudes on the lid part 41 side from the surface opposing the closed lid part 41. The raised part 52 extends along a direction orthogonal to the lengthwise direction of the wire harness main body 11. The raised part 52 is provided on the end portion of the engaging member 51 in the circumferential direction of the first path restricting members 21, for example.

The raised part 52 is fitted into the through hole 45 provided in the lid part 41. That is, the raised part 52 is a second engaging part that is engagingly fitted together with the through hole 45 serving as the first engaging part. The raised part 52 is contactable, in the circumferential direction of the enclosing part 33, with the through hole 45 into which the raised part 52 is fitted. Accordingly, the range over which the enclosing part 33 and the engaging member 51 are movable relative to each other is limited to the range over which the raised part 52 is able to move within the through hole 45, which is a long hole, in the circumferential direction of the enclosing part 33. Also, the raised part 52 is contactable, in the lengthwise direction of the wire harness main body 11, with the through hole 45 into which the raised part 52 is fitted.

In a cross section of the raised part 52 orthogonal to the center axis C of the intermediate portion 25, a tangent of one circumferential end of the raised part 52 that passes through the center axis C is given as T5, and the tangent of the other circumferential end of the raised part 52 that passes through the center axis C is given as T6. A dimension θ3 of the raised part 52 in the circumferential direction of the wire harness main body 11 is the occupation angle of the raised part 52 centered on the center axis C, that is, the angle that is formed by the tangent T5 and the tangent T6.

On the other hand, in a cross section of the through hole 45 orthogonal to the center axis C of the intermediate portion 25, a tangent of one circumferential end of the through hole 45 that passes through the center axis C is given as T7, and a tangent of the circumferential end portion of the through hole 45 that passes through the center axis C is given as T8. A dimension θ4 of the through hole 45 in the circumferential direction of the wire harness main body 11 is the occupation angle of the through hole 45 centered on the center axis C, that is, the angle that is formed by the tangent T7 and the tangent T8.

In the circumferential direction of the wire harness main body 11, the dimension θ4 of the through hole 45 is larger than the dimension θ3 of the raised part 52. The raised part 52 is thereby movable along the circumferential direction of the wire harness main body 11 in the through hole 45. That is, within the range over which the raised part 52 is positioned within the through hole 45, the engaging member 51 is movable relative to the lid part 41 in the circumferential direction of the wire harness main body 11.

Note that, in the present embodiment, the first path restricting members 21 engage the engaging members 51 in the circumferential direction, but do not engage the engaging members 51 in a direction along the lengthwise direction of the wire harness main body 11. Accordingly, the position of the first path restricting members 21 in the lengthwise direction of the wire harness main body 11 is adjustable, in a state where the first path restricting members 21, the second path restricting member 31 and the engaging members 51 are attached to the wire harness main body 11. Note that after adjusting the position of the first path restricting members 21 in the lengthwise direction of the wire harness main body 11, the first path restricting members 21 are fixed to the exterior member 13 by a band-like member such as an adhesive tape or a fastening band, for example. Accordingly, when assembling the wire harness 10 to an assembly surface A of the vehicle body, the first path restricting members 21 do not shift in the lengthwise direction of the wire harness main body 11.

Operation of the present embodiment will now be described.

In the straight part 11s of the path of the wire harness main body 11 to which the first path restricting members 21 are attached, the rigidity of the first path restricting members 21 keeps the wire harness main body 11 from bending under its own weight or the like. Also, in the bent part 11c to which the second path restricting member 31 is attached, the rigidity of the second path restricting member 31 keeps the wire harness main body 11 from bending under its own weight or the like.

As shown in FIG. 5, the wire harness 10 is disposed along the assembly surface A of the vehicle body. The wire harness 10 is then fixed to the assembly surface A by a fixing member (not shown). Note that the point on the path of the wire harness 10 at which the wire harness 10 is fixed to the assembly surface A by the fixing member is set to at least one of the first path restricting members 21, the second path restricting member 31, and a place of the exterior member 13 where the first path restricting members 21 and the second path restricting member 31 are not provided, for example.

When the wire harness 10 has been assembled to the assembly surface A, the lid part 41 of the enclosing members 33 is located closer to the assembly surface A than is the main body part 32. When the vehicle V is on the ground and the assembly surface A is under the floor of the vehicle V, the assembly surface A faces the ground. Accordingly, the main body part 32 of the second path restricting member 31 is located more on the ground side than is the lid part 41.

Here, the position of the first insertion opening 22 in the circumferential direction in the first path restricting members 21 is determined by the lid part 41 and the engaging member 51 that engages the lid part 41. Accordingly, the first insertion opening 22 is constituted so as to face the lid part 41 side, that is, the assembly surface A side. That is, the first path restricting members 21 cover the ground side of the exterior member 13. The first path restricting members 21 are thereby able to suitably protect the exterior member 13 from projectiles and water droplets, for example. The first path restricting members 21 are thereby able to contribute to improving the durability of the wire harness main body 11.

Also, when the wire harness 10 has been assembled to the assembly surface A, the main body part 32 of the second path restricting member 31 covers the ground side of the exterior member 13. The main body part 32 is thereby able to suitably protect the exterior member 13 from projectiles and water droplets, for example. The second path restricting member 31 is thereby able to contribute to improving the durability of the wire harness main body 11.

Effects of the present embodiment will now be described.

(1) The first path restricting members 21 restrict the straight parts 11s of the path of the wire harness main body 11. The second path restricting member 31 restricts the bent part 11c of the path of the wire harness main body 11. The first path restricting members 21 and the second path restricting member 31 are separate members from each other. The position of the first path restricting members 21 with respect to the second path restricting member 31 is thus adjustable.

The first insertion opening 22 of the first path restricting members 21 is an opening extending in the lengthwise direction of the first path restricting members 21, and extends over the entire length of the first path restricting members 21. It is thereby possible to attach the first path restricting members 21 to the exterior member 13 through the first insertion opening 22, after performing terminal processing such as attaching a connector to a lengthwise end portion of the wires 12. In this way, the first path restricting members 21 are subsequently attachable, thus enabling the assembly workability of the wire harness 10 to be improved.

The engaging member 51 that engages the second path restricting member 31 in the circumferential direction of the wire harness main body 11 are disposed in the first insertion opening 22 of the first path restricting members 21. According to this configuration, the engaging member 51 can be constituted to be contactable with the first insertion opening 22 in the circumferential direction of the first path restricting members 21. The engaging member 51 thereby restrict rotation of the first path restricting members 21 in the circumferential direction thereof, thus enabling the first path restricting members 21 to be kept from rotating in the circumferential direction.

(2) In the circumferential direction of the wire harness main body 11, the dimension θ2 of the engaging member 51 is smaller than the dimension θ1 of the first insertion opening 22. According to this configuration, the engaging member 51 is movable along the circumferential direction of the wire harness main body 11, within the first insertion opening 22. Accordingly, it is possible to adjust the relative position of the first path restricting members 21 with respect to the engaging members 51 and the second path restricting member 31 in the circumferential direction of the wire harness main body 11.

(3) In the circumferential direction of the wire harness main body 11, the dimension θ4 of the through hole 45 serving as the first engaging part is larger than the dimension θ3 of the raised part 52 serving as the second engaging part. According to this configuration, the engaging member 51 is movable relative to the lid part 41 in the circumferential direction of the wire harness main body 11, within the range over which the raised part 52 is positioned within the through hole 45. Accordingly, it is possible to adjust the relative positions of the engaging members 51 and the first path restricting members 21 with respect to the second path restricting member 31 in the circumferential direction of the wire harness main body 11.

(4) The second path restricting member 31 has the enclosing parts 33 that surround the outer periphery of the first path restricting members 21. The enclosing parts 33 have the end portion 32a of the main body part 32 of the second path restricting member 31 and the lid part 41 that is connected to the end portion 32a. Also, the through hole 45 is provided on the lid part 41. According to this configuration, the second path restricting member 31 that includes the enclosing parts 33 is subsequently attachable to the first path restricting members 21, due to the enclosing parts 33 being divided into the main body part 32 and the lid part 41. The assembly workability of the wire harness 10 can thereby be even further improved.

(5) The main body part 32 has the second insertion opening 36 which is an opening along the lengthwise direction of the second path restricting member 31 and extending over the entire length of the second path restricting member 31. The lid part 41 covers the second insertion opening 36, at the end portion 32a of the main body part 32. It is thereby possible to attach the second path restricting member 31 to the exterior member 13 through the second insertion opening 36, after performing terminal processing such as attaching a connector to a lengthwise end portion of the wires 12. In this way, the second path restricting member 31 is subsequently attachable, thus enabling the assembly workability of the wire harness 10 to be further improved.

(6) In the enclosing parts 33, the lid part 41 is disposed so as to be closer to the assembly surface A than is the main body part 32. According to this configuration, the through hole 45 of the enclosing parts 33 that engage the engaging members 51 disposed within the first insertion opening 22 is provided in the lid part 41 which is closer to the assembly surface A. Also, in the first path restricting members 21, the position of the first insertion opening 22 in the circumferential direction is determined by the engaging members 51. That is, according to this configuration, the first insertion opening 22 of the first path restricting members 21 can be constituted so as to face the lid part 41 side, that is, the assembly surface A side. Accordingly, the first insertion opening 22 of the first path restricting members 21 can be kept from facing the opposite side to the assembly surface A. As a result, the first path restricting members 21 are able to suitably protect the exterior member 13.

(7) The first path restricting member 21 is provided for each of the two straight parts 11s provided one on either side of the bent part 11c in the path of the wire harness main body 11. Also, the engaging member 51 is provided in the first insertion opening 22 of the pair of first path restricting members 21. According to this configuration, it is possible to adjust the position of the first path restricting members 21 disposed on both sides of the second path restricting member 31 in the lengthwise direction of the wire harness main body 11.

(8) The first path restricting members 21 have the first end portion 23 and the second end portion 24 which are both end portions in the circumferential direction of the first path restricting members 21 and form the first insertion opening 22. Also, the first path restricting members 21 have the protruding part 26 that protrudes from the inner surface of both the first end portion 23 and the second end portion 24 and contacts the outer surface of the exterior member 13. The first path restricting members 21 can thus be suitably kept from detaching the exterior member 13 through the first insertion opening 22. Accordingly, the first path restricting members 21 are provisionally fixed to the outer periphery of the exterior member 13 by the protruding parts 26 provided thereto, and thus workability at the time of disposing the engaging members 51 in the first insertion opening 22 of the first path restricting members 21 that are provisionally fixed to the exterior member 13 is improved. As a result, the assembly workability of the wire harness 10 can be further improved.

(9) The protruding part 26 protrudes from the inner surface of both the distal end 23a of the first end portion 23 and the distal end 24a of the second end portion 24. According to this configuration, the first path restricting members 21 can be better kept from detaching from the exterior member 13 through the first insertion opening 22, compared to the case where the protruding part 26 protrudes from the inner surface at a position slightly away from the distal end 23a of the first end portion 23 and the distal end 24a of the second end portion 24, for example.

(10) The distal end 23a of the first end portion 23 and the distal end 24a of the second end portion 24 are both curved, as seen from the lengthwise direction of the first path restricting members 21. The exterior member 13 can thus be smoothly inserted inside the first path restricting members 21 through the first insertion opening 22 that is formed by the distal ends 23a and 24a. Also, the exterior member 13 is less likely to be damaged, when inserting the exterior member 13 inside the first path restricting members 21 through the first insertion opening 22.

(11) The cross-sectional shape of the first path restricting members 21 is the same over the entire length of the first path restricting members 21. According to this configuration, the first path restricting members 21 can be easily manufactured, by using an extruder that extrudes the raw material of the first path restricting members 21 in the lengthwise direction. Also, a plurality of types of first path restricting members 21 having different lengthwise dimensions can be manufactured using a single extruder.

(12) The protruding parts 26 extend over the entire length of the first path restricting members 21. According to this configuration, the bending rigidity of the first path restricting members 21 can be enhanced. Also, the protruding parts 26 contact the outer surface of the exterior member 13 over the entire length of the first path restricting members 21. The first path restricting members 21 can thus be kept from detaching the exterior member 13 through the first insertion opening 22 over the entire length of the first path restricting members 21.

The present embodiment can be implemented in a changed manner as follows. The present embodiment and the following example changes can be implemented in combination with each other to the extent that there no technical inconsistencies.

The second path restricting member 31 of the above embodiment may be constituted to have a plurality of through holes 45. In that case, as shown in FIG. 6, for example, the plurality of through holes 45 may be disposed to be displaced from each other in the circumferential direction of the wire harness main body 11.

In the configuration shown in FIG. 6, the lid part 41 of each second path restricting member 31 has three through holes 45, for example. The three through holes 45 are disposed to be displaced from each other in the lengthwise direction of the wire harness main body 11. The central positions of respective through holes 45 in the circumferential direction of the wire harness main body 11 are displaced from each other in the circumferential direction of the wire harness main body 11. Also, projections of the respective through holes 45 in the lengthwise direction of the wire harness main body 11 overlap each other between through holes 45 adjacent in the lengthwise direction of the wire harness main body 11.

According to this configuration, the orientation of the first path restricting members 21 in the circumferential direction of the wire harness main body 11 is changeable. To elaborate, the orientation of the first path restricting members 21 in the circumferential direction of the wire harness main body 11 changes, depending on which of the plurality of through holes 45 the raised part 52 of the engaging members 51 is fitted into.

As shown in FIG. 6, the three through holes 45 are denoted as through hole 45a, through hole 45b and through hole 45c, in order from the side close to the hinge part 42 in the circumferential direction of the enclosing parts 33.

Figure 7:
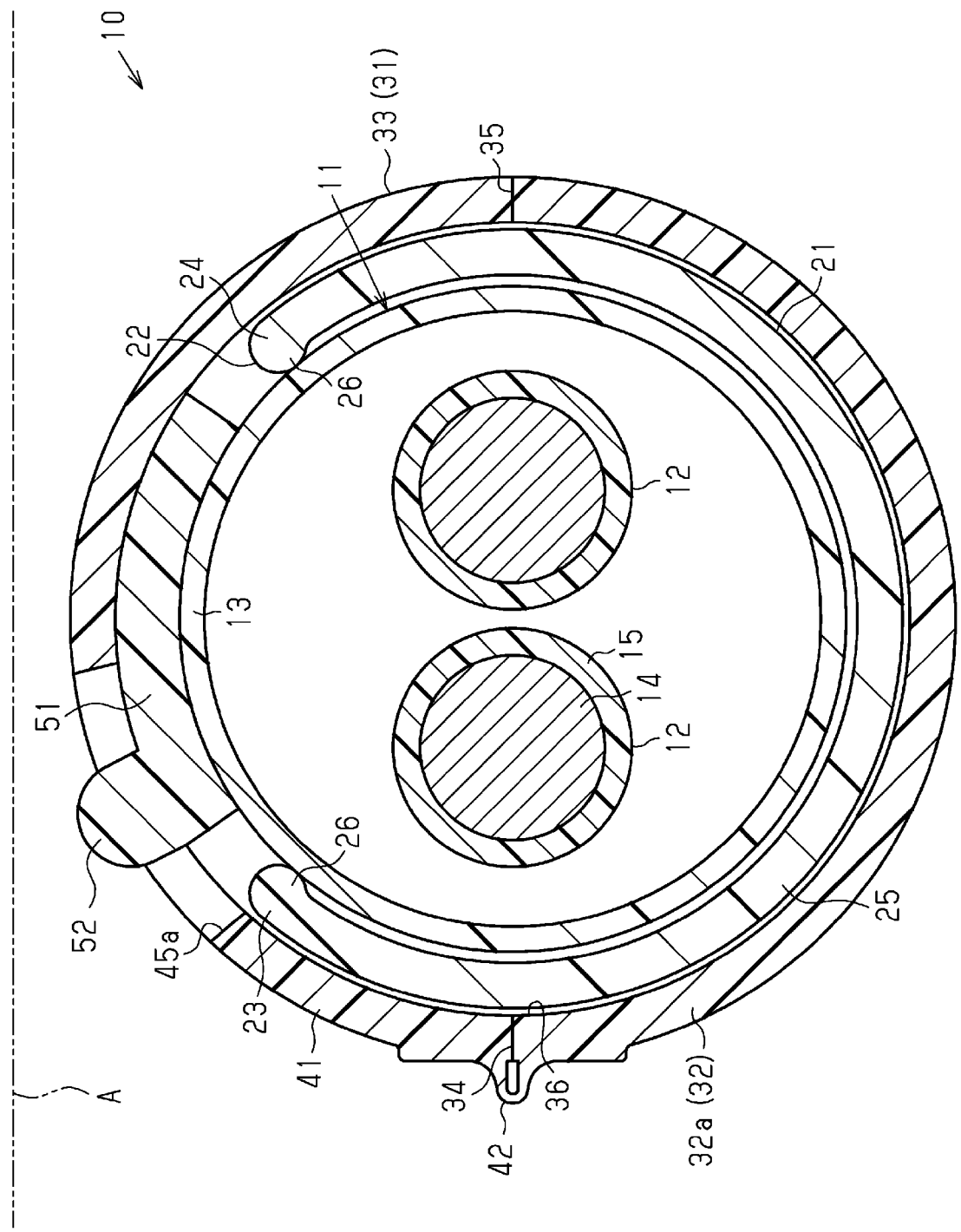
FIG. 7 is a cross-sectional view taken along line 7-7 in FIG. 6.

In the state shown in FIGS. 6 and 7, the raised part 52 of the engaging members 51 is fitted into the through hole 45a. In this state, the opening direction of the first insertion opening 22 of the first path restricting members 21 has the same orientation as the opening direction of the second insertion opening 36 of the second path restricting member 31.

Figure 8:
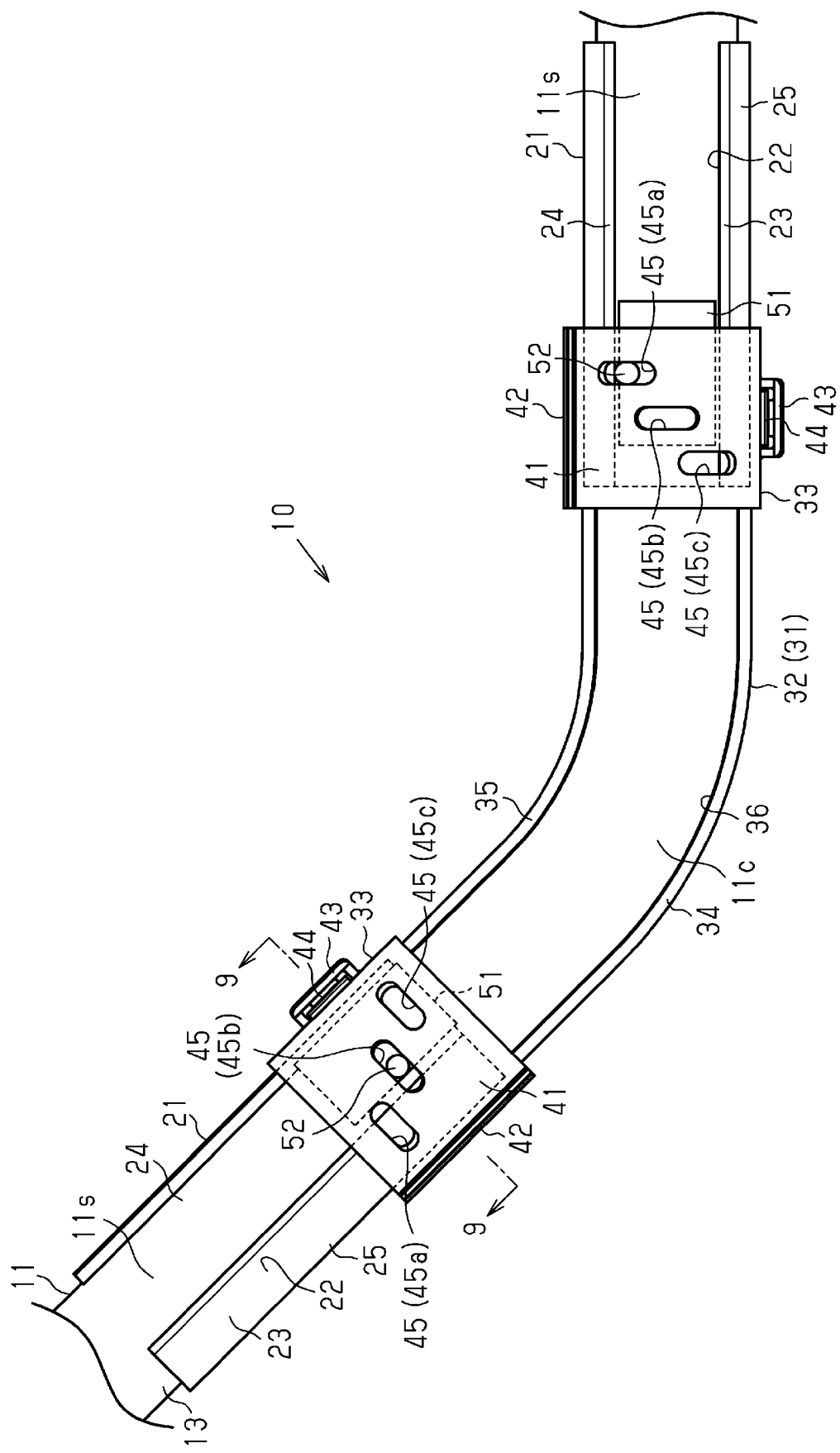
FIG. 8 is a plan view for describing operation of the wire harness of the example change.
Figure 9:
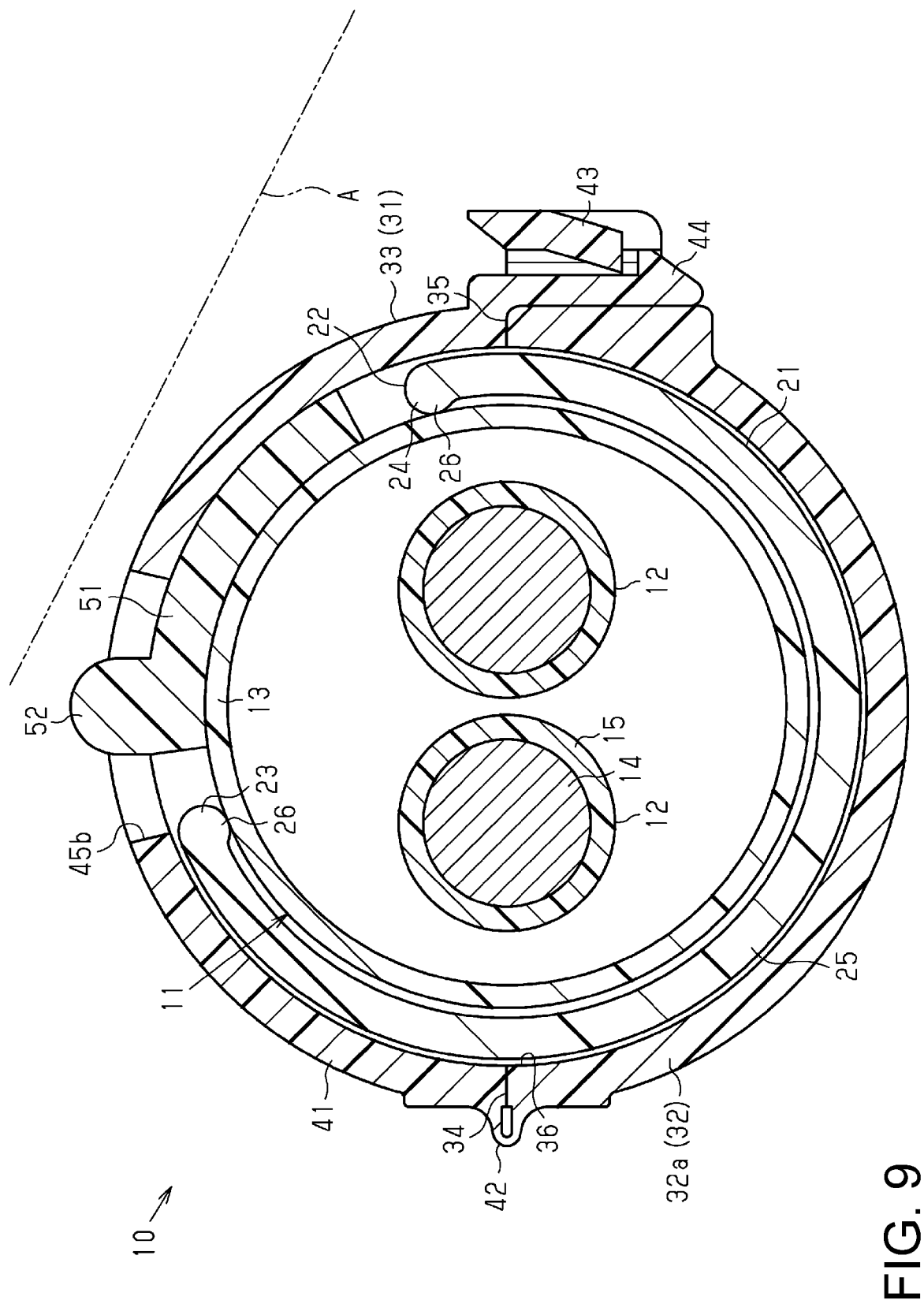
FIG. 9 is a cross-sectional view taken along line 9-9 in FIG. 8.

On the other hand, in the state shown in FIGS. 8 and 9, the raised part 52 of one of the engaging members 51 is fitted into the through hole 45b. In this state, the opening direction of the first insertion opening 22 of one first path restricting member 21 does not have the same orientation as the opening direction of the second insertion opening 36 of the second path restricting member 31.

In this way, according to this configuration, the circumferential orientation of the first path restricting members 21 is changeable, while positioning the first path restricting members 21 in the circumferential direction with respect to the second path restricting member 31. It is thereby possible to change the orientation of the first path restricting members 21 in the circumferential direction thereof such that the first insertion opening 22 face the assembly surface A side, according to the path along which the wire harness main body 11 bends. As a result, this configuration is able to contribute to improving the degree of freedom in the layout of the wire harness 10.

Note that the disposition and number of the plurality of through holes 45 are not limited to the configuration shown in FIG. 6, and can be changed as appropriate. For example, the through holes 45 may be disposed such that projections of the respective through holes 45 in the lengthwise direction of the wire harness main body 11 do not overlap each other.

In the engaging members 51, a raised part that protrudes from the surface opposing the exterior member 13 may be provided, and the raised part may be fitted into the recessed part of the corrugated tube serving as the exterior member 13. According to such a configuration, the raised part of the engaging members 51 engages the recessed part of the corrugated tube in the lengthwise direction of the corrugated tube. Accordingly, the engaging members 51 and the exterior member 13 are less likely to move relatively in the lengthwise direction of the exterior member 13.

In the above embodiment, the raised part 52 is provided at an end portion of the engaging members 51 in the circumferential direction of the first path restricting members 21, but, alternatively, the raised part 52 may, for example, be provided in a central portion of the engaging members 51 in the circumferential direction of the first path restricting members 21.

In the circumferential direction of the wire harness main body 11, the dimension θ4 of the through hole 45 serving as the first engaging part may be approximately equivalent to the dimension θ3 of the raised part 52 serving as the second engaging part.

In the circumferential direction of the wire harness main body 11, the dimension θ2 of the engaging member 51 may be approximately equivalent to the dimension θ1 of the first insertion opening 22.

In the above embodiment, the through hole 45 serving as the first engaging part that fits into the raised part 52 of the engaging member 51 is provided in the lid part 41 of the enclosing parts 33. However, the present disclosure is not limited thereto, and the through hole 45 may, for example, be provided in the end portion 32a of the main body part 32. According to this configuration, the first path restricting members 21 can be positioned in the circumferential direction at a position where the first insertion opening 22 faces toward the end portion 32a of the main body part 32.

In the above embodiment, the first engaging part that engagingly fits together with the raised part 52 serving as the second engaging part is the through hole 45 that passes through the lid part 41, but, alternatively, the first engaging part may, for example, be a recessed part that does not pass through the lid part 41.

In the above embodiment, a configuration is adopted in which the first engaging part of the second path restricting member 31 is the through hole 45, the second engaging part of the engaging members 51 is the raised part 52, and the first engaging part and the second engaging part fit together engagingly, but the relationship in which these parts fit together engagingly may be reversed. In this case, the second path restricting member 31 has a raised part serving as a first engaging part that protrudes toward the engaging member 51 from the lid part 41, for example. Also, the engaging members 51 have a recessed part serving as a second engaging part that fits into the raised part serving as the first engaging part. With this configuration, approximately similarly effects as the above embodiment can be obtained.

In the enclosing parts 33 of the above embodiment, the end portion 32a of the main body part 32 and the lid part 41 are integrally formed with each other, but the present disclosure is not particularly limited thereto, and the end portion 32a of the main body part 32 and the lid part 41 may be formed separately.

The protruding part 26 of the above embodiment protrudes from the distal end 23a of the first end portion 23, but the present disclosure not limited thereto, and the protruding part 26 may be provided at a position further away from the first insertion opening 22 than is the distal end 23a of the first end portion 23, in the circumferential direction of the first path restricting members 21. Also, the protruding part 26 of the above embodiment protrudes from the distal end 24a of the second end portion 24, but the present disclosure is not limited thereto, and the protruding part 26 may be provided at a position further away from the first insertion opening 22 than is the distal end 24a of the second end portion 24, in the circumferential direction of the first path restricting members 21.

In the first path restricting members 21, the protruding parts 26 may be partially provided in the lengthwise direction of the first path restricting members 21.

In the first path restricting members 21, at least one of the protruding part 26 of the first end portion 23 and the protruding part 26 of the second end portion 24 may be omitted.

In the first path restricting members 21, a second protruding part that protrudes from the inner surface of the intermediate portion 25 and contacts the outer surface of the exterior member 13 may be provided. According to this configuration, it is possible for the protruding part 26 and the second protruding part to both be brought in contact with the outer surface of the exterior member 13, and, as a result, the first path restricting members 21 can be kept from rattling.

In the first path restricting members 21, a groove extending along the lengthwise direction may be provided in the outer peripheral surface of the intermediate portion 25. According to this configuration, it is possible to easily widen the first insertion opening 22, due to the intermediate portion 25 being easily deformed to the outer peripheral side with the groove as the origin. As a result, this configuration is able to contribute to improving the assemblability of the first path restricting members 21.

The first path restricting members 21 may be constituted such that the radial thickness of the intermediate portion 25 changes in the circumferential direction.

The shape of the intermediate portion 25 of the first path restricting members 21 is not limited to being a circular arc shape, and is changeable to an elliptical arc shape, for example. Also, the shape of the inner peripheral surface of the second path restricting member 31 is not limited to a circular arc shape, and is changeable to an elliptical arc shape, for example.

In the above embodiment, a configuration may be adopted in which a slit extending along the lengthwise direction to the exterior member 13 is provided, and the first path restricting members 21 are fixable in the slit. The number of second path restricting members 31 provided in the wire harness 10 is determined as appropriate according to the path of the wire harness main body 11, and one or a plurality of second path restricting members 31 are provided.

In the above embodiment, the first path restricting member 21 is provided on both sides of the second path restricting member 31 in the lengthwise direction of the wire harness main body 11, but the first path restricting member 21 may be provided only on one side of the second path restricting member 31 in the lengthwise direction of the wire harness main body 11.

In the above embodiment, the wires 12 are high-voltage electrical wires, but the present disclosure not limited thereto, and the wires 12 may, for example, be low-voltage electrical wires.

The embodiment and example changes disclosed herein should be considered in all respects to be illustrative and not restrictive. The scope of the disclosure is defined by the claims rather than by the foregoing description, and all changes that come within the meaning and range of equivalency of the claims are intended to be embraced therein.

As shown in FIGS. 2 and 5, the engaging members 51 may be a plate-like members curved in a circular arc shape, as seen from the lengthwise direction of the wire harness main body 11. Also, in the closed state of the lid part 41, the outer surface of the engaging members 51 may be in intimate contact with the inner surface of the lid part 41. Also, in the closed state of the lid part 41, the inner surface of the engaging members 51 may be in intimate contact with the outer surface of the exterior member 13. As shown in FIG. 5, in the closed state of the lid part 41, the distal end of the raised part 52 may protrude more radially outward of the lid part 41 than is the outer surface of the lid part 41.

As shown in FIG. 5, the distal end 23a of the first end portion 23 and the distal end 24a of the second end portion 24 of the first path restricting members 21 may respectively oppose both circumferential end portions of the engaging member 51. In a state where the engaging member 51 is disposed within the first insertion opening 22, and the first path restricting member 21 is enclosed by the enclosing parts 33, a circumferential gap may be formed between the first end portion 23 and the engaging member 51 and between the second end portion 24 and the engaging member 51.

As shown in FIG. 4, the lengthwise width of the engaging member 51 along the lengthwise direction of the wire harness main body 11 may be larger than the lengthwise width of the enclosing part 33 along the lengthwise direction of the wire harness main body 11, and, as shown in FIG. 6, the lengthwise width of the engaging member 51 may be smaller than the lengthwise width of the enclosing part 33. Note that the dimension θ2 of the engaging member 51 may be referred to as the circumferential width of the engaging member 51. Similarly, the dimension θ1 of the first insertion opening 22 may be referred to as the circumferential width of the first insertion opening 22, the dimension θ3 of the raised part 52 may be referred to as the circumferential width of the raised part 52, and the dimension θ4 of the through hole 45 may be referred to as the circumferential width of the through hole 45.

As shown in FIG. 5, the surface of the distal end 23a of the first end portion 23 may be a circular arc shape smoothly continuous with the surface of the protruding part 26 of the first end portion 23, as seen from the lengthwise direction of the first path restricting members 21. In other words, the distal end 23a and protruding part 26 of the first end portion 23 may have circular arc-shaped surfaces that extend on the same circumference, as seen from the lengthwise direction of the first path restricting members 21. Similarly, the surface of the distal end 24a of the second end portion 24 may be a circular arc shape smoothly continuous with the surface of the protruding part 26 of the second end portion 24. In other words, the distal end 24a and protruding part 26 of the second end portion 24 may have circular arc-shaped surfaces that extend on the same circumference, as seen from the lengthwise direction of the first path restricting members 21. Note that the first end portion 23 may be referred to as a first edge portion, and the second end portion 24 may be referred to as a second edge portion. Also, the protruding part 26 of the first end portion 23 may be referred to as a first protruding part, and the protruding part 26 of the second end portion 24 may be referred to as the second protruding part.

As shown in FIG. 2, the first insertion opening 22 may be a first groove along the lengthwise direction of the first path restricting members 21 and extending linearly over the entire length of the first path restricting members 21, and the first groove may be open at both ends in the lengthwise direction of the first path restricting members 21. As shown in FIGS. 2 and 5, the entire first insertion opening 22 may face the side on which the assembly surface A is provided, which is, for example, the opposite side to the ground, in a state where the engaging members 51 are disposed within the first insertion opening 22 and the first path restricting members 21 are enclosed by the enclosing parts 33. The first path restricting members 21 may be referred to as first path regulating members that regulate the path of the straight parts 11s of the wire harness main body 11.

As shown in FIG. 2, the second insertion opening 36 may be a second groove that bends along the lengthwise direction of the second path restricting member 31, and the second groove may be open at both ends in the lengthwise direction of the second path restricting member 31. As shown in FIGS. 2 and 5, the entire second insertion opening 36 may face the side on which the assembly surface A is provided, which is, for example, the opposite side to the ground, in a state where the wire harness 10 is assembled to the assembly surface A. The second path restricting member 31 may be referred to as a second path regulating member that regulates the path of the bent part 11c of the wire harness main body 11.

As shown in FIGS. 4 and 5, an end portion of the first path restricting members 21 in the lengthwise direction thereof may be inserted within the second insertion opening 36.

The present disclosure encompasses the following implementation examples. The reference numerals of a number of constituent elements of the exemplary embodiments have been added as an aid to understanding rather than for limitation purposes. Some of the matters described in the following implementation examples may be omitted, and some of the matters described in the implementation examples may be selected or extracted and combined.

Supplementary Note 1

In one mode of the present disclosure, the engaging member (51) may be a plate-like member curved in a circular arc shape, as seen from the lengthwise direction of the wire harness main body (11), in the closed state of the lid part (41), the outer surface of the engaging member (51) may be in intimate contact with the inner surface of the lid part (41), and the inner surface of the engaging member (51) may be in intimate contact with the outer surface of the exterior member (13).

Supplementary Note 2

In one mode of the present disclosure, the protruding part (26) may protrude from the inner surface of both of the distal end of the first end portion (23) and the distal end of the second end portion (24), and as seen from the lengthwise direction of the first path restricting member (21), the surface of the distal end (23a) of the first end portion (23) may be a circular arc shape smoothly continuous with the surface of the protruding part (26) of the first end portion (23), and the surface of the distal end (24a) of the second end portion (24) may be a circular arc shape smoothly continuous with the surface of the protruding part (26) of the second end portion (24).

The invention claimed is:

1. A wire harness to be attached to a vehicle body, the wire harness comprising:
   a wire harness main body having an electrical wire and an exterior tube covering the electrical wire;
   a first path restrictor attached to an outer periphery of the exterior tube and restricting a path of a straight part which is a portion of a path of the wire harness main body that is straight;
   a second path restrictor attached to the outer periphery of the exterior tube and restricting a path of a bent part which is a portion of the path of the wire harness main body that bends; and
   an engagement engaging the second path restrictor in a circumferential direction of the wire harness main body, wherein:
      the first path restrictor has an insertion opening which is an opening along a lengthwise direction of the first path restrictor and extending over an entire length of the first path restrictor,
      the engagement is disposed within the insertion opening,
      the second path restrictor has a first engaging part which is a raised part or a recessed part, and
      the engagement has a second engaging part engagingly fitting together with the first engaging part, and engaging the first engaging part in the circumferential direction of the wire harness main body.

2. The wire harness according to claim 1, wherein, in the circumferential direction of the wire harness main body, a dimension of the engagement is smaller than a dimension of the insertion opening.

3. The wire harness according to claim 1, wherein:
   one of the first engaging part and the second engaging part is a recessed part,
   the other of the first engaging part and the second engaging part is a raised part, and
   in the circumferential direction of the wire harness main body, a dimension of the recessed part is larger than a dimension of the raised part.

4. The wire harness according to claim 1, wherein:
   the first engaging part of the second path restrictor is a plurality of first engaging parts, and
   the plurality of first engaging parts are disposed to be displaced in the circumferential direction of the wire harness main body.

5. The wire harness according to claim 1, wherein:
   the second path restrictor has an enclosing part surrounding an outer periphery of the first path restrictor,
   the enclosing part has part of a main body of the second path restrictor, and a lid that is connected to the main body, and
   the first engaging part is provided in the lid.

6. The wire harness according to claim 5, wherein:
   the insertion opening of the first path restrictor is a first insertion opening,
   the main body has a second insertion opening which is an opening along a lengthwise direction of the second path restrictor and extending over an entire length of the second path restrictor, and
   the lid partially covers the second insertion opening in the lengthwise direction of the second path restrictor.

7. The wire harness according to claim 5, wherein:
   the vehicle body has an assembly surface to which the wire harness main body is to be assembled, and
   the lid is disposed so as to be closer to the assembly surface than is the main body.

8. The wire harness according to claim 1, wherein:
   the first path restrictor is provided for each of a pair of the straight part provided one on either side of the bent part on the path of the wire harness main body, and
   the engagement is provided in the insertion opening of each of the pair of first path restrictors.

9. The wire harness according to claim 1, wherein:
   the first path restrictor has:
      a first end and a second end which are both ends in a circumferential direction of the first path restrictor and form the insertion opening; and
      a protrusion protruding from an inner surface of at least one of the first end and the second end and contacting an outer surface of the exterior tube.

10. The wire harness according to claim 9, wherein the protrusion protrudes from an inner surface of a distal end of at least one of the first end and the second end.

* * * * *